United States Patent
Nakaya et al.

(10) Patent No.: US 7,299,031 B2
(45) Date of Patent: Nov. 20, 2007

(54) MOBILE COMMUNICATION TERMINAL CAPABLE OF STORING AUDIO MESSAGES IN MULTIPLE AUDIO COMPRESSION FORMATS

(75) Inventors: Keisuke Nakaya, Daito (JP); Akiyoshi Shimogishi, Sakai (JP); Yousuke Ishida, Shijyounawate (JP)

(73) Assignees: Sanyo Electric Co., Ltd., Osaka (JP); Sanyo Telecommunications Co., Ltd., Osaka (JP)

( * ) Notice: Subject to any disclaimer, the term of this patent is extended or adjusted under 35 U.S.C. 154(b) by 0 days.

(21) Appl. No.: 10/869,567

(22) Filed: Jun. 16, 2004

(65) Prior Publication Data

US 2005/0037738 A1    Feb. 17, 2005

(30) Foreign Application Priority Data

Jun. 18, 2003    (JP) .............................. 2003-172948

(51) Int. Cl.
*H04L 12/56*    (2006.01)

(52) U.S. Cl. .................. 455/412.1; 455/413; 370/320; 704/500; 704/504

(58) Field of Classification Search ................ 455/425, 455/412.1, 414.1, 414.3, 432.1, 432.2, 72, 455/412.2, 413; 370/320; 339/67.1–80; 704/500–504

See application file for complete search history.

(56) References Cited

U.S. PATENT DOCUMENTS

| | | | |
|---|---|---|---|
| 6,035,212 A * | 3/2000 | Rostoker et al. | 455/552.1 |
| 6,464,743 B2 * | 10/2002 | Kanno et al. | 55/450 |
| 6,522,878 B1 * | 2/2003 | Andrews et al. | 455/425 |
| 6,799,034 B2 * | 9/2004 | Higuchi et al. | 455/414.4 |
| 2001/0039187 A1 * | 11/2001 | Shively | 455/412 |
| 2003/0210659 A1 * | 11/2003 | Chu et al. | 370/320 |
| 2005/0170823 A1 * | 8/2005 | Okazaki et al. | 455/418 |

FOREIGN PATENT DOCUMENTS

| | | |
|---|---|---|
| JP | 09-284202 | 10/1997 |
| JP | 2003-078608 | 3/2003 |
| JP | 2003-152888 | 5/2003 |

* cited by examiner

*Primary Examiner*—Duc M. Nguyen
*Assistant Examiner*—Justin Lee

(57) ABSTRACT

A mobile communication terminal stores a plurality of response messages generated according to respectively different audio compression methods. If the mobile communication terminal is not answered when an incoming call is received, the mobile communication terminal transmits the one of the response messages that has been generated according to the audio compression method designated by a base station.

15 Claims, 7 Drawing Sheets

MOBILE COMMUNICATION TERMINAL CAPABLE OF STORING AUDIO MESSAGES IN MULTIPLE AUDIO COMPRESSION FORMATS

BACKGROUND OF THE INVENTION (1) Field of the Invention

The present invention relates to a international roaming-capable mobile communication terminal that has a response message transmission function.

(2) Description of the Related Art

Conventionally, telephones have a function for playing an audio response message such as "I'm unable to come to the phone right now . . . " when the user of the telephone is unable to answer the telephone for reasons such as being absent from home (see Reference 1).

This function is included not only in land-line telephones, but also in mobile communication terminals, such as mobile telephones, with which audio communication is possible.

Since mobile telephone are portable, there have been demands from users to be able to use the mobile telephone that the user uses in his or her own country, and the functions of the mobile telephone that can be used in the user's own country, when the user goes overseas.

In response to such demands, international roaming services have been implemented that enable users to use the mobile telephones that they use in their own country overseas.

However, an international roaming-capable mobile telephone must support the audio compression method used in the regions in which the mobile telephone is to be used. This is because, presently, several different types of audio compression are used internationally.

Since one audio compression method, such as EVRC, is used in Japan, response message data compressed in this format is not able to be listened to in another country that uses another audio compression method such as QCELP. Tin other words, in order to listen to audio encoded according to a particular audio compression method, it is necessary to decode an encoded digital signal in that format, and convert the decoded signal to an analog signal. Consequently, when a different audio compression method is used, the encoded digital signal is unable to be decoded correctly, and the audio cannot be listened to. This can be seen in Japanese Laid-Open Patent No. H06-78049.

SUMMARY OF THE INVENTION

In view of the stated problems, the object of the present invention is to provide a mobile communication terminal, such as a mobile telephone, that is capable of using a response message service in Japan and other countries.

In order to solve the stated problems, the mobile communication terminal of the present invention includes: a message storage unit operable to store a plurality of audio messages that have been generated in respectively different formats; a format obtaining unit operable to obtain, from a base station, format identification information that identifies a format, during an incoming call from the base station; a message selection unit operable to select, from among the stored audio messages, an audio message that has been generated in the identified format; and a message transmission unit operable to transmit the selected audio message to the base station.

Here, format refers to the data structure of data generated based on a standard for an encoding method such as an audio compression method, and "differing" formats refers to formats that are based on different encoding methods.

Note that QCELP (Qualcomm Code Excited Linear Predictive coding) is an audio compression method developed by Qualcom. EVRC refers to Enhanced Variable Rate CODEC.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

The following describes a mobile telephone that is a mobile communication terminal of an embodiment of the present invention, with use of FIGS. 1 to 7.

In addition to response message data encoded according to an audio compression method used domestically in Japan, the mobile telephone stores response message data encoded according to an audio compression method used outside Japan. The mobile telephone transmits a selected response message according to an instruction from a base station.

<Structure>

Figure 1:
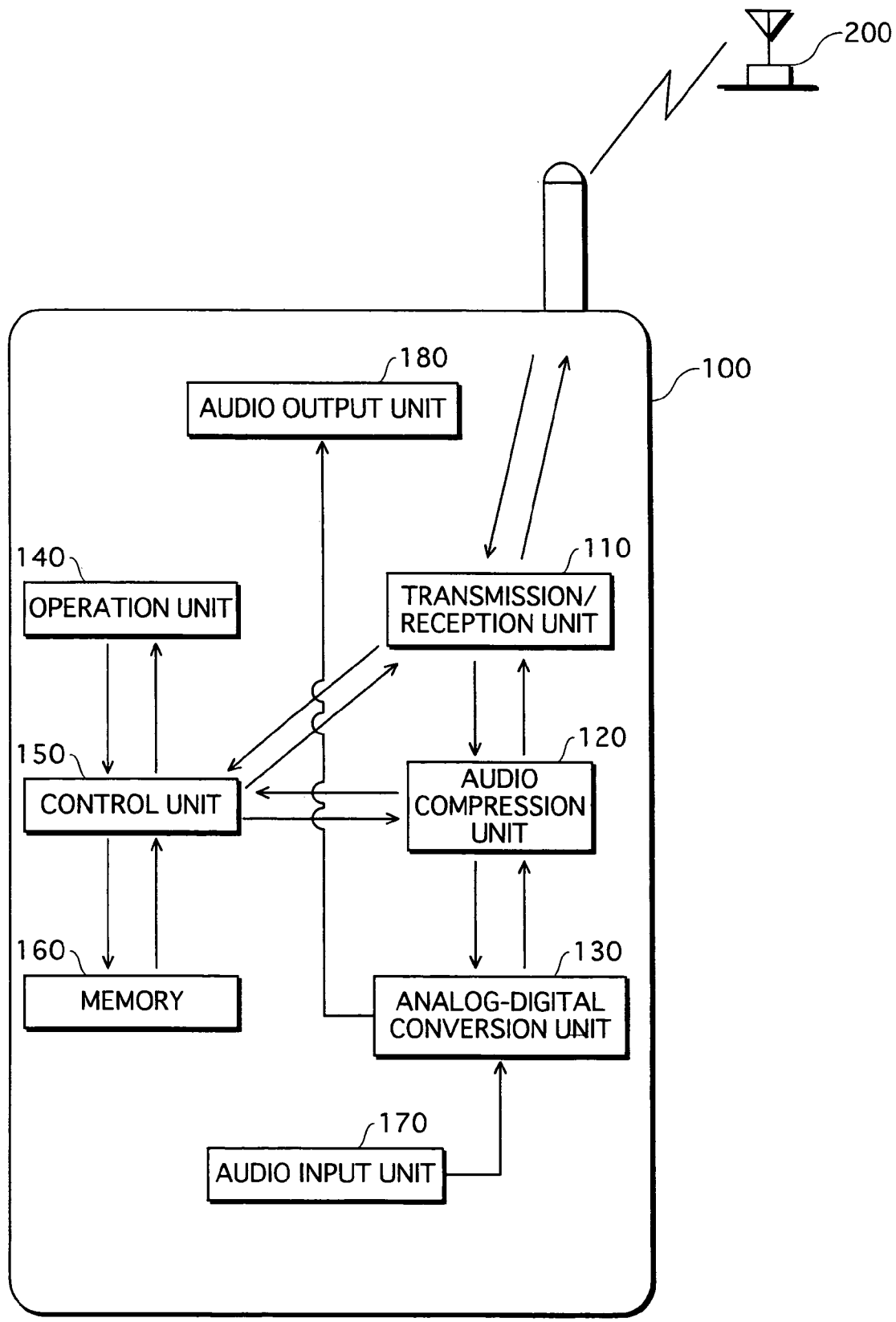
FIG. 1 is a functional block diagram of a mobile telephone of an embodiment of the present invention.

FIG. 1 is a functional block diagram of the mobile telephone of an embodiment of the present invention.

The mobile telephone 100 is composed of a transmission/reception unit 110, an audio compression unit 120, an analog-digital conversion unit 130, an operation unit 140, a control unit 150, a memory 160, an audio input unit 170, and an audio output unit 180.

The transmission/reception unit 110 has a function of transmitting and receiving radio signals to and from a base station 200.

The audio compression unit 120 has a function of encoding an audio digital signal that is audio that has been digitized, and a function of decoding an encoded audio digital signal.

The analog-digital conversion unit 130 has a function of performing conversion between analog and digital audio signals.

The operation unit 140 has buttons and the like for data input and a display for displaying data, and has functions of displaying data and receiving user instructions.

The control unit 150 has functions such as transferring data between the various components of the mobile telephone 100, and controlling the various components.

The memory 160 has a function of storing data and programs. The response data is also stored in the memory 160. The response data is described later with use of FIG. 2.

The audio input unit 170 is a microphone, and has a function of receiving input of audio generated by the user.

The audio output unit 180 is a speaker, and has a function of outputting audio such as the voice of the opposite party.

The following example of ordinary audio communication illustrates simply the relationship between the various components.

The transmission/reception unit 110 receives an incoming call, and the user receives the call by pressing a button of the operation unit 140. The audio input unit 170 receives audio generated by the user who has received the call, and the analog-digital conversion unit 130 converts the audio to an audio digital signal and passes the audio digital signal to the audio compression unit 120. Having received the digital signal of the audio generated by the user, the audio compression unit 120 encodes the audio digital signal according to an audio compression method specified by the base station 200, and passes the compressed audio digital signal to the transmission/reception unit 110. The transmission/reception unit 110 transmits the received compressed audio digital signal to the based station 200 in accordance with a predetermined format.

Note that information relating to the audio compression method specified by the base station is stipulated in the communication data received at the time of the incoming call.

Furthermore, an audio digital signal of audio generated by the opposite party of the call is received by the transmission/reception unit 110, and after being subject to particular processing such as amplification, is passed to the audio compression unit 120. The audio compression unit 120 decodes the audio digital signal of the opposite party according to the format specified by the base station 200, and passes the decoded audio digital signal to the analog-digital conversion unit 130. The analog-digital conversion unit 130 converts the audio digital signal to an analog signal, and outputs the analog signal to the audio output unit 180, which outputs audio.

<Data>

Figure 2:
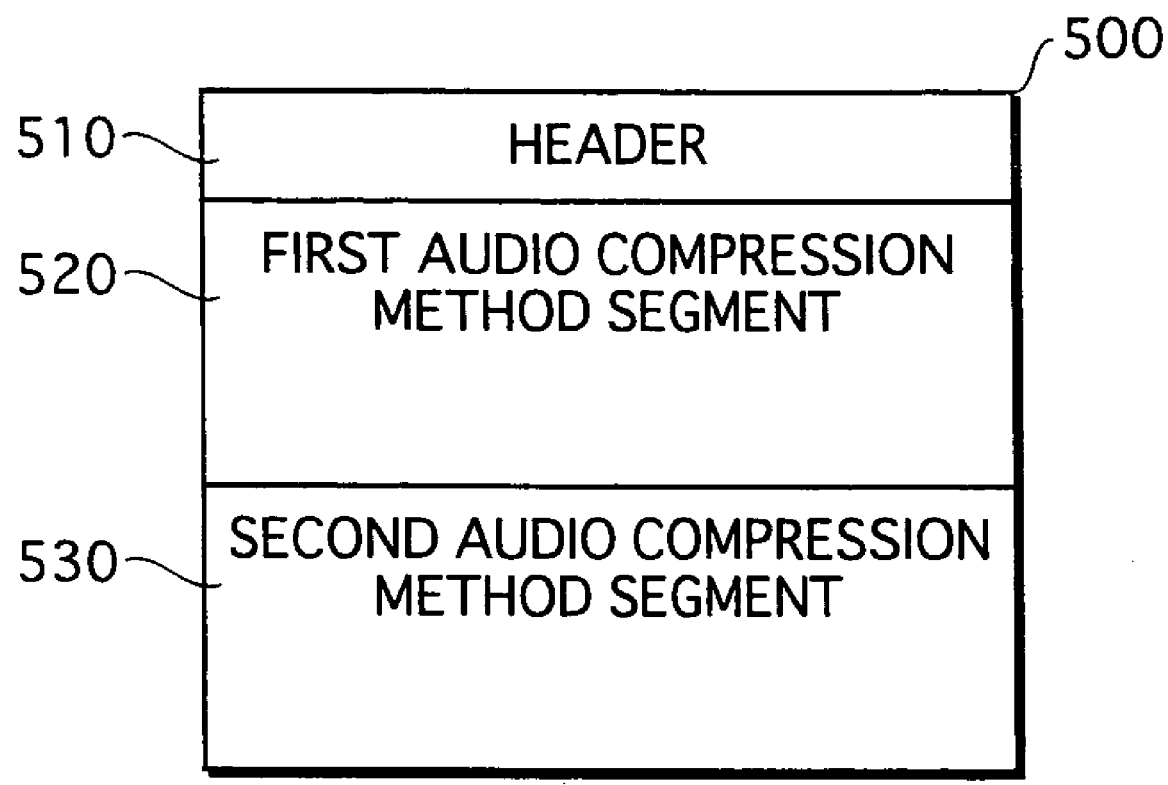
FIG. 2 shows an example of the structure and contents of response message data.

The following describes data used when the mobile telephone 100 transmits a response message, with use of FIG. 2.

FIG. 2 shows an example of the structure and contents of response message data.

Response message data 500 is composed of a header 510, a first audio compression method data segment 520, and a second audio compression method data segment 530.

Here, the header 510 includes the head address of each audio compression method data segment, the length of each audio compression method data segment, and type information of each audio compression method. Each audio compression method data segment head address maybe, for example, an address in the memory 160, or an offset address from the head of the response message data 500.

The first audio compression method data segment 520 includes message response data encoded according to a first audio compression method such as EVRC. Furthermore, the second audio compression method data segment 530 includes data response data encoded according to a second audio compression method such as Qcelp.

Note that the contents of the response message encoded according to the first audio compression method and the contents of the response message encoded according to the second audio compression method are identical, and only the audio compression methods differ.

The present example illustrates a case in which one type of response message exists, and two audio compression methods are supported.

<Operations>

The following describes operations of the mobile telephone 100, with use of FIGS. 1 to 7.

The mobile telephone of the present invention includes functions of performing two types of processing: response message transmission processing and response message generation processing.

<Response Message Transmission Processing>

The response message transmission processing may start at either of two different points, the first being when a certain "paging" time has passed, and the second being when the user performs a response message transmission operation.

Response message transmission processing when a certain paging time has elapsed is described first.

Figure 3:
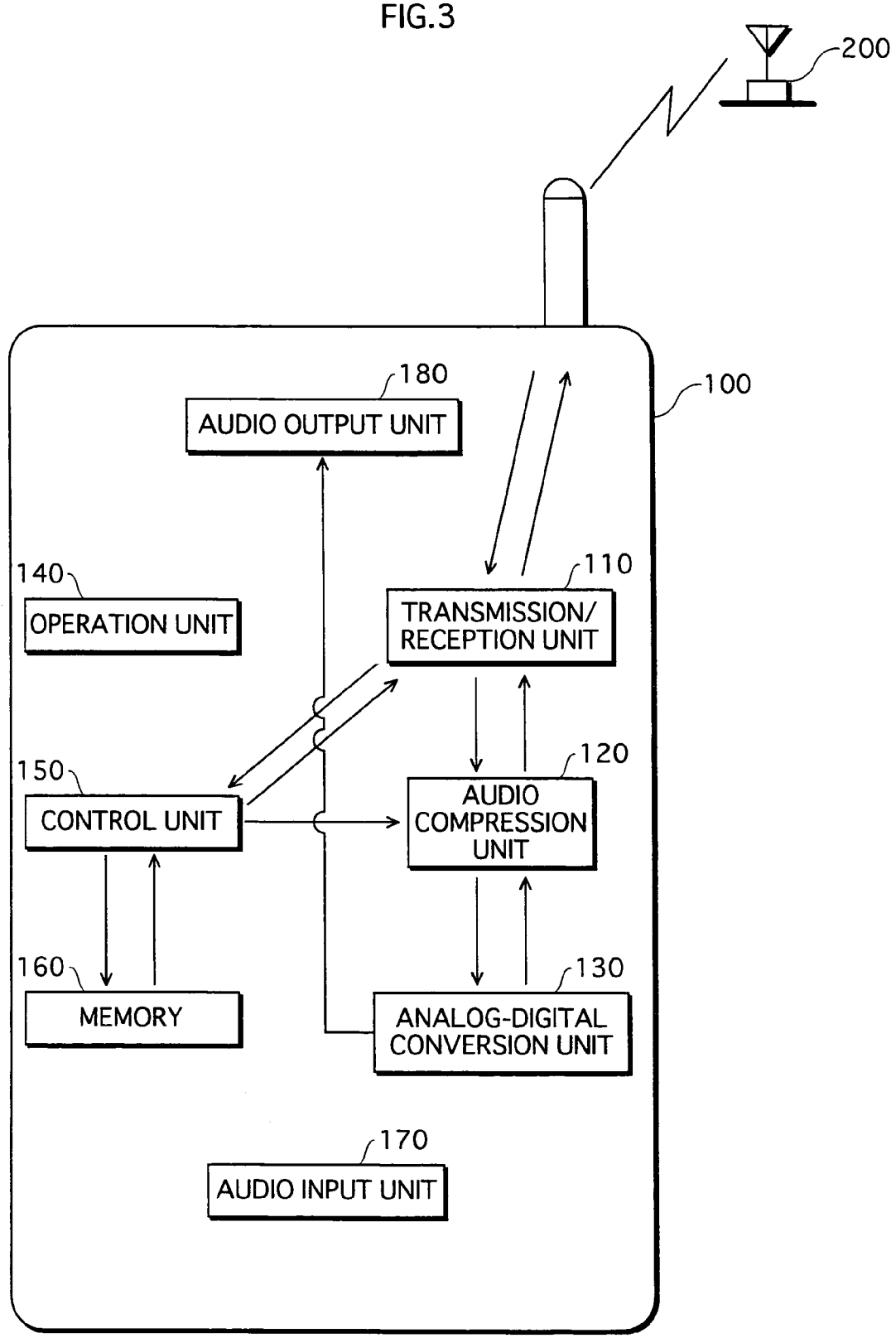
FIG. 3 shows the flow of data in response message transmission processing.

FIG. 3 shows the flow of data in response message transmission processing.

When an incoming call is received, the transmission/reception unit 110 notifies the control unit 150 to that effect. Having received notification of the incoming call, the control unit 150 performs processing such as that for producing a ringtone, and commences processing for measuring time from when the incoming call was first received. When a certain paging time has elapsed since the incoming call was first received, the control unit 150 commences response message transmission processing.

Here, "paging time" denotes a time from when reception of the incoming call occurs through to when the response message is transmitted. Information relating to the paging time is stored in the memory 160. Note that response message transmission processing is not performed if the user answers the call before the paging time elapses.

The following describes response message transmission processing performed after the paging time has elapsed.

Figure 4:
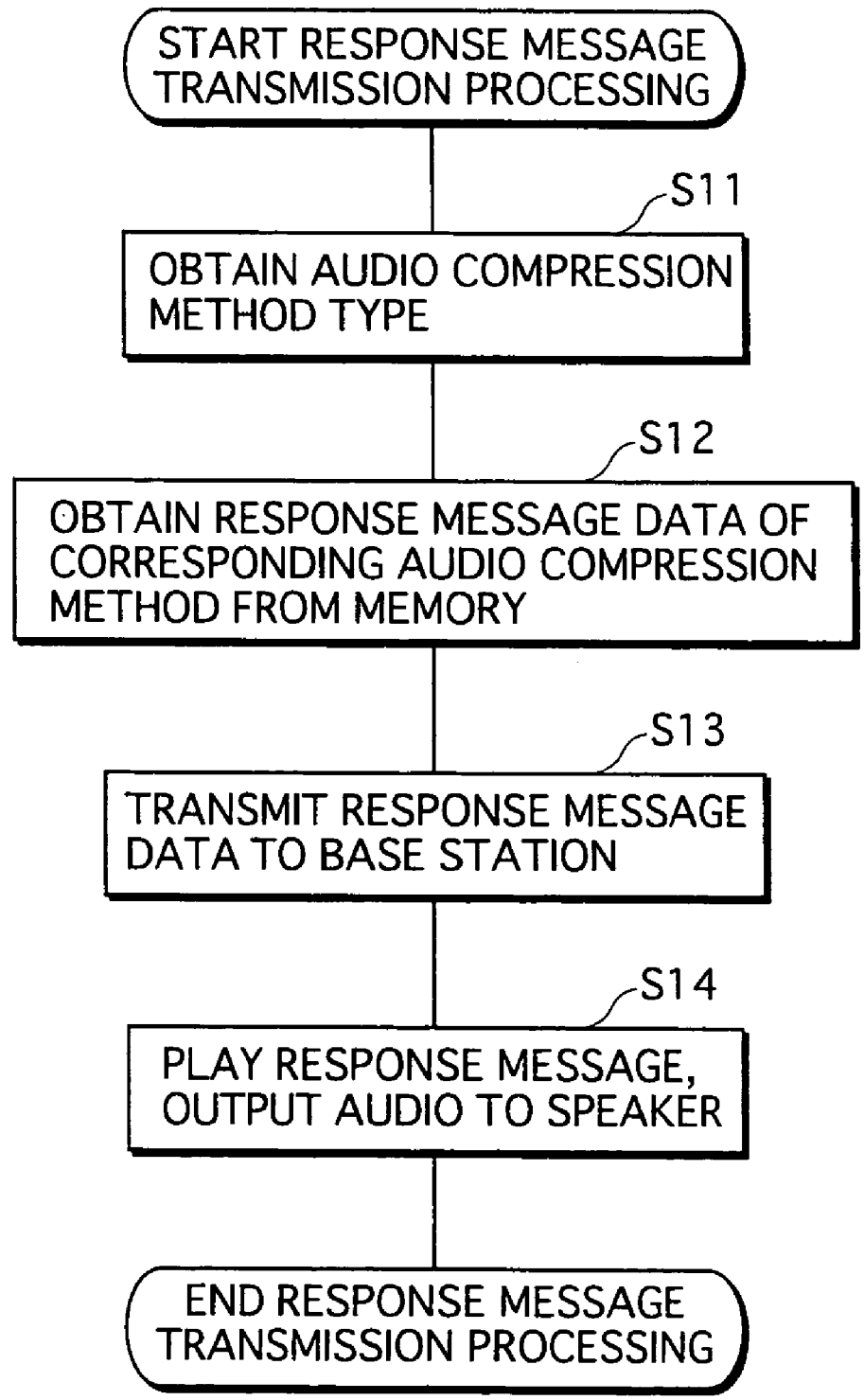
FIG. 4 is a flowchart showing response message transmission processing.

FIG. 4 is a flowchart showing response message transmission processing.

Having received notification that the paging time has elapsed, the control unit 150 obtains the audio compression method type from information that is included in data received from the base station at the time of reception of the incoming call and that indicates the audio compression method (step S11). The control unit 150 obtains, from the response message data 500 stored in the memory 160, the response message data that has been generated with the same audio compression method as indicated by the obtained audio compression method type, based on the header 510 of the response message data 500 (step S12). Specifically, the control unit 150 determines the storage place of the corresponding response message data based on the type information of the audio compression method included in the header 510 and the head address of each audio compression method data segment, and obtains the response message data (see FIG. 2).

After selecting the response message data, the control unit 150 passes the selected response message data to the transmission/reception unit 110.

The transmission/reception unit 110 receives the response message data, and transmits the response message data to the based station 200 in accordance with a predetermined communication method (step S13).

The response message data is transmitted directly by the transmission/reception unit 110, unlike audio in an ordinary call which passes through the analog-digital conversion unit 130 and the audio compression unit 120.

Next, the control unit 150 transmits data that is identical to the response data passed to the transmission/reception unit 110 to the audio compression unit 120.

The audio compression unit 120 receives the response message data, decodes the received response message data according to the audio compression method with which the response message was encoded, and passes the decoded response message data to the analog-digital conversion unit 130 as an audio digital signal.

The analog-digital conversion unit 130 receives the audio digital signal, converts the digital signal to an analog signal, and passes the analog signal to the audio output unit 180 which outputs audio (step S14).

In other words, when the user is unable to answer the telephone, a response message is transmitted to the opposite party, and the user is able to listen to the message.

The following describes response message transmission processing when the user performs a response message transmission operation.

When an incoming call is received, the transmission/reception unit 110 notifies the control unit 150 to that effect. Having received notification of the incoming call, the control unit 150 performs processing such as that for producing a ringtone.

The user performs an operation for transmitting a response message while the ringtone is being emitted.

The operation unit 140 receives a response message transmission instruction from the user, and notifies the control unit 150 to that effect. The control unit 150 receives the notification of the response message transmission instruction and commences response message transmission processing.

Subsequent operations are as described from response message transmission processing after the paging time has elapsed (see FIG. 4).

<Response Message Generation Processing>

A response message may be generated by either of two methods.

The first method is for the user to directly recorded a response message into the mobile telephone, and the second method is to download response message data via a communication path to the memory of the mobile telephone.

Figure 5:
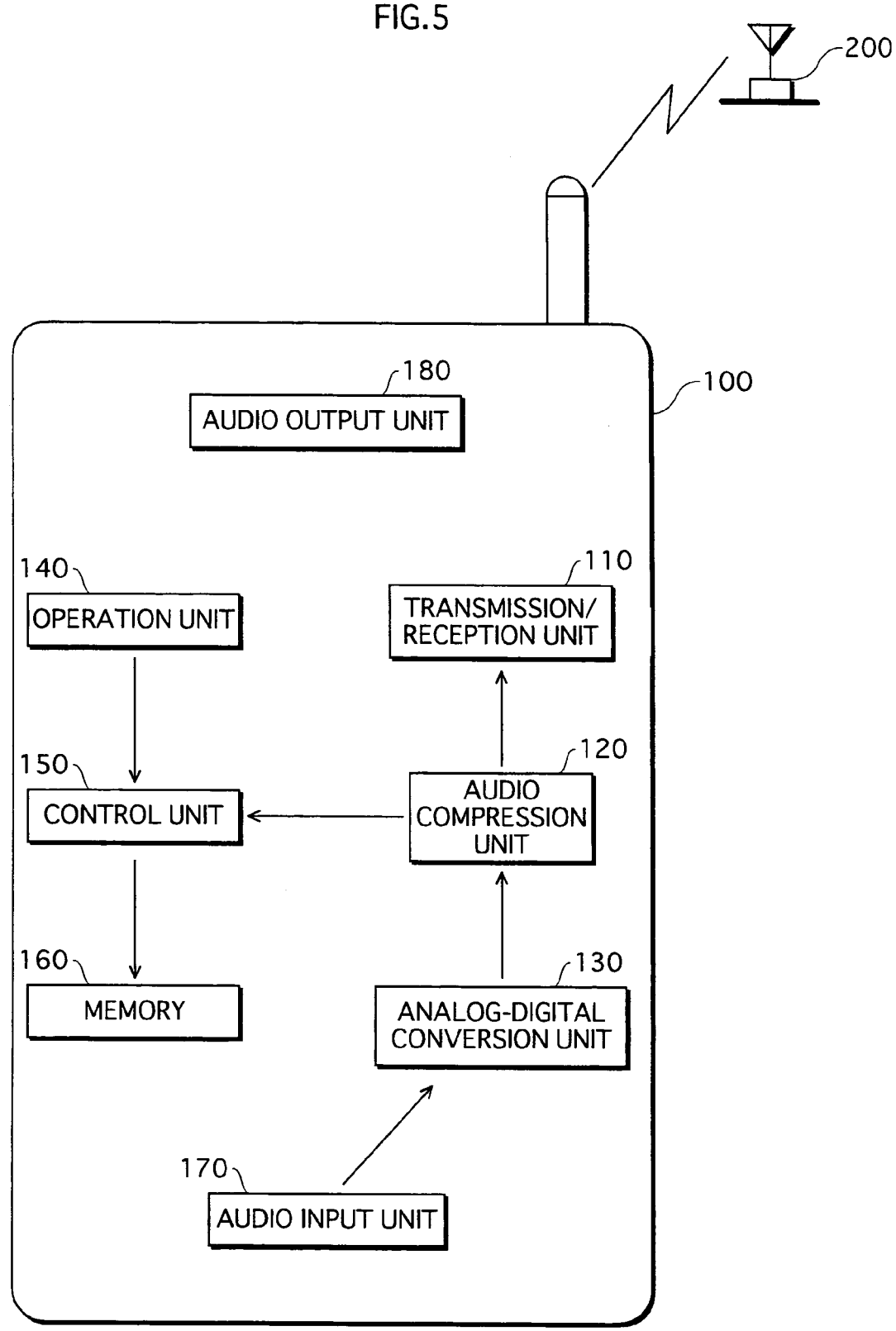
FIG. 5 shows the flow of data in response message input processing.
Figure 6:
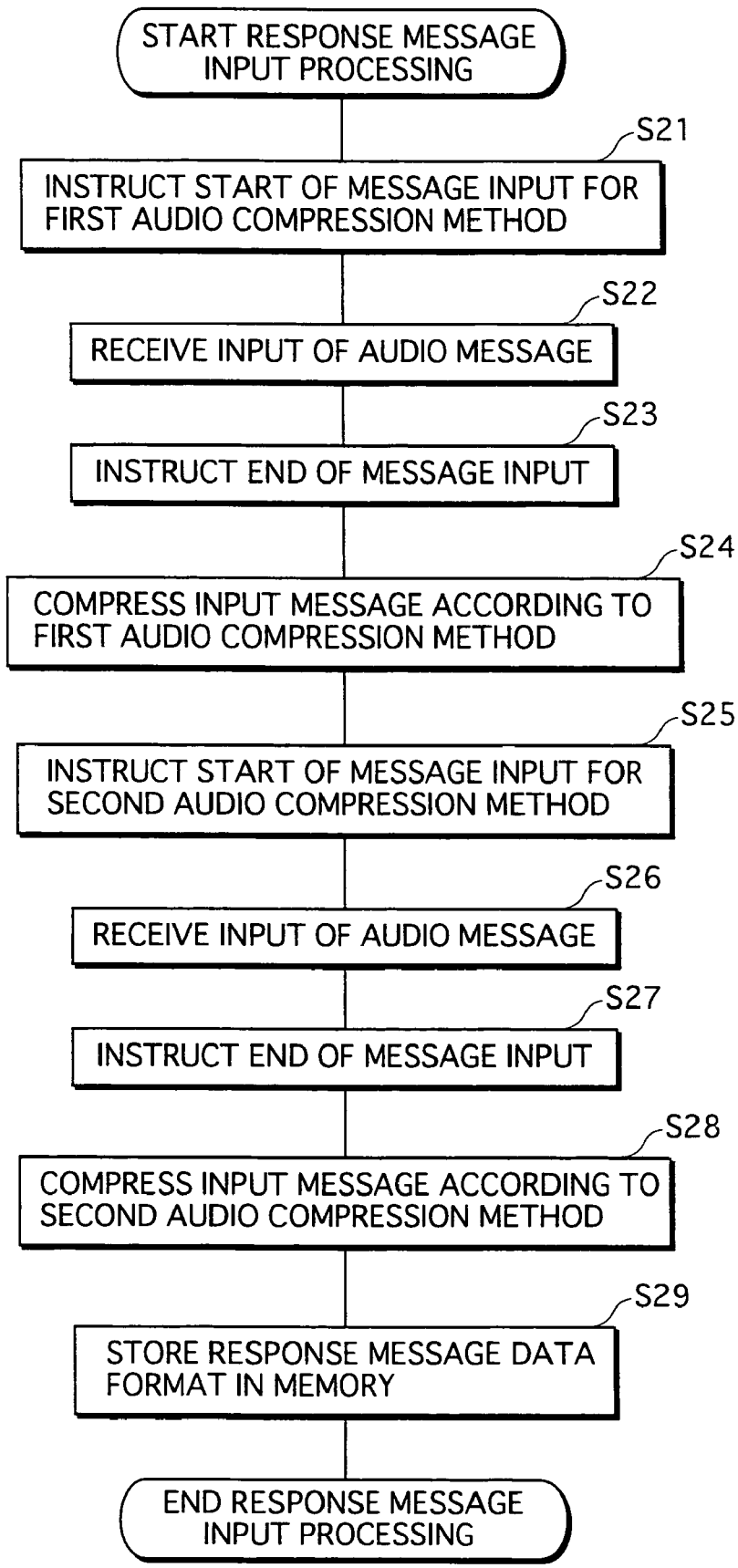
FIG. 6 is a flowchart of response message input processing.

First, the method for the user to record a message is described with use of FIGS. 5 and 6.

FIG. 5 shows the flow of data in response message input processing.

In order to record a response message, the user first sends an instruction to the control unit 150 through the operation unit 140. The control unit 150 receives the instruction, and after performing initialization processing to prepare for response message input processing, sends an audio response message input instruction.

The audio input unit 170 receives the audio input by the user, and passes the audio to the analog-data conversion unit 130 as an audio analog signal.

The analog-digital conversion unit 130 receives the audio analog signal, and converts the audio analog signal to an audio digital signal which it outputs to the audio compression unit 120.

The audio compression unit 120 receives the audio digital signal, compresses the received audio digital signal according to the audio compression method specified by the control unit 150, generates response message data, and passes the response message data to the control unit 150. Here, it is assumed that the audio compression method has been notified by the control unit 150 in advance.

The control unit 150 receives the response message data, and stores the response message data in the memory 160.

FIG. 6 is a flowchart of response message input processing.

First, the user operates a button or the like of the operation unit 140 so as to instruct the control unit 150 to record a response message. The control unit 150 receives the instruction, and informs the user of commencement of input of a response message for the first audio compression method (step S21). The control unit 150 may inform the user by producing a beeping sound or the like.

Having recognized the instruction to commence input of the response message, the user inputs an audio response message into the audio input unit 170 (step S22), an example of the response message being "I'm unable to answer the phone right now. Leave a message and I'll call you back later."

Meanwhile, after informing the user of commencement of input of the response message, the control unit 150 then informs the user of the end of input of the response message, a certain number of seconds after commencement of the message (step S23). Here, the number of seconds is the length of the response message as stipulated by the specifications of the mobile telephone.

Furthermore, the control unit 150 notifies the audio compression unit 120 that the audio compression method for the response message presently input is the first audio compression method.

The audio input unit 170 passes the audio response message input by the user thereto to the analog-digital conversion unit 130, and the analog-digital conversion unit 130 converts the response signal into an audio digital signal.

The analog-digital conversion unit 130 passes the audio digital signal to the audio compression unit 120, which generates encoded response message data according to the first audio compression method and passes the encoded response message data to the control unit 150 (step S24).

The control unit 150 receives the encoded response message data, and informs the user of commencement of response message input for the second audio compression method (step S25).

The user inputs an audio response message (step S26), which is processed in the same manner as for the first audio compression method at step S23 and step S24 (step S27, step S28). Note that the audio response message input at step S26 is identical in content to the response message input during the processing for the first audio compression method. Furthermore, the control unit 150 notifies the audio compression unit 120 that the audio compression method is the second audio compression method.

The control unit 150 receives the response message data encoded according to the second audio compression method, generates the response message data 500 in which the response message data encoded according to the first audio compression method is stored in the first audio compression method segment 520, and the response message data encoded according to the second audio compression method is stored in the second audio compression method segment 530, and stores the response message data 500 in the memory 160 (step S29).

Note that a response message may be recorded either of the first audio compression method and the second audio compression method according to an instruction from the user through the operation unit 140.

Figure 7:
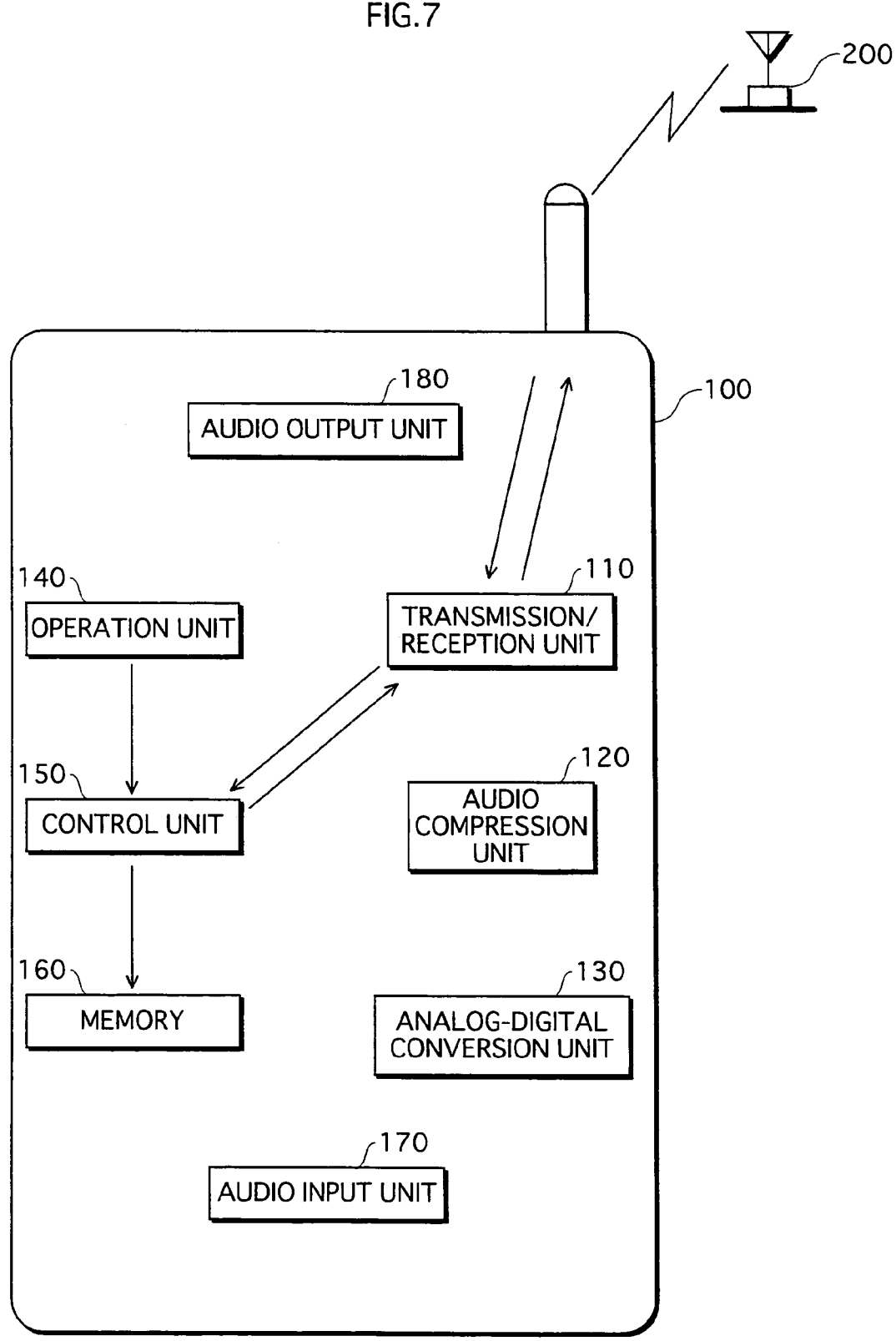
FIG. 7 shows the flow of data in response message download processing.

With use of FIG. 7, the following describes the method for downloading response message data to the memory of the mobile telephone via a communication path.

FIG. 7 shows the flow of data in response message download processing.

Using the operation unit 140, the user designates a response message that he or she wishes to download, and instructs downloading. As one example, the user may designate a response message to download from an Internet page that provides response messages, and instruct the download.

Note that here it is assumed that the response message to be downloaded is in the same format as the response message data 500 (see FIG. 2).

The control unit 150 receives the response message download instruction, receives the response message data that is specified in the instruction, via the transmission/reception unit 110, and stores the downloaded response message data in the memory 160.

Note that when downloading response message data, it is possible to specify downloading of one of the first audio compression method data and the second audio compression method data that compose the response message data 500. In this case, response message data that is already stored in the memory 160 is overwritten only in the segment corresponding to the audio compression method of the downloaded data.

<Other Remarks>

Although the mobile communication terminal of the present invention has been described based on a preferred embodiment, the mobile communication terminal may be modified, and is not limited to the described preferred embodiment.

(1) Although the response message data 500 (see FIG. 2) includes one response message encoded according to two different audio compression methods, the response message data 500 may instead include two or more messages encoded according to two or more different audio compression methods.

If two or more response messages are supported, the response message is designated and transmitted based on the telephone number or the like of the party from who the telephone call has been received. In this case, it is necessary for the mobile telephone apparatus to have a setting unit for setting the correspondence between the response messages and opposite parties' telephone numbers and the like, and a designation unit for designating a response message based on the telephone number or the like. Furthermore, a selection unit is necessary for the user to select a response message when the user chooses to transmit a response message himself/herself while the ringtone is ringing.

Furthermore, although the response messages of the first audio compression method and the second audio compression method have identical content in the preferred embodiment, the content of the data of the different audio compression methods of one type of response message may be completely different in content. For example, the content of the messages may be identical in meaning, but with one response message in Japanese and the other response message in English. Alternatively, the two messages may be completely different in meaning.

Such a structure is convenient because the user is able to change the response message depending on the mobile telephone of the opposite party who is to receive the response message.

(2) Instead of the header 510 of the response message data 500 (see FIG. 2) including type information about the audio compression method as in the preferred embodiment, data may be stored to a storage area predetermined for each type of audio compression method notified by the base station.

(3) Although the user inputs a response message for each supported audio compression method in the preferred embodiment, the portable communication terminal may instead have a structure by which response messages are generated for each supported audio compression method based on a response message that has been input once.

Here, the former method, in other words the method of the preferred embodiment, is advantageous because it is unnecessary to store the input response message in a work area as un-compressed digital data, and therefore relatively little memory capacity is required.

On the other hand, the latter method, although requiring the input response message in a work area as un-compressed digital data, is advantageous in terms of operability when generating the response message.

(4) In the preferred embodiment, information relating to the paging time, which is the time from the incoming call being received through to the response message being transmitted, is stored in the memory. This paging time may be changed by the user.

In this case, it is necessary for the mobile communication terminal to have an obtaining unit that obtains the paging time from the user, and a storage unit that stores the obtained paging time to the memory.

(5) A program that has a CPU execute control processing (see FIG. 1) for enabling the functions of the mobile communication terminal described in the preferred embodiment may be distributed recorded on a recording medium or via a communication path. The recording medium may be an IC card, an optical disc, a flexible disc, a ROM (read only memory), or the like. The distributed program may be provided for use by being stored in a memory or the like that is readable by a CPU in a device, and the functions of the mobile communication terminal described in the preferred embodiment may be realized by the CPU executing the program.

<Effects of the Invention>

As described, the mobile communication terminal of the present invention includes: a message storage unit operable to store a plurality of audio messages that have been generated in respectively different formats; a format obtaining unit operable to obtain, from a base station, format identification information that identifies a format, during an incoming call from the base station; a message selection unit operable to select, from among the stored audio messages, an audio message that has been generated in the identified format; and a message transmission unit operable to transmit the selected audio message to the base station.

According to the stated structure, audio messages generated in a plurality of formats are stored, and therefore audio messages having identical content can be transmitted in various formats. In other words, no matter what format is supported by the mobile communication terminal of the opposite party, the party is able to listen to an audio message transmitted to the party.

As one example, a response message function of a mobile telephone can be used not only in Japan, but also in another country that uses a different audio compression method to that used in Japan.

Here, the mobile communication terminal may further include an obtaining unit operable to download the plurality of audio messages via a communication network, and store the downloaded audio messages in the message storage unit.

According to the stated structure, audio messages in a plurality of formats can be downloaded at once, and therefore the user can download audio messages without being conscious of the format. Furthermore, since the downloaded audio message data is already in a compressed format, excessive burden is not placed on the memory of the mobile telephone.

Furthermore, the user is able to download one audio message in one format, and therefore is able to easily update only the audio message in the one format. This contributes to a reduction of communication costs because only the necessary audio message is downloaded.

In addition, providers of audio messages may provide set messages for international roaming-capable mobile communication terminals.

Here, the mobile communication terminal may further include a playback unit operable to play the audio message when the message transmission unit transmits the audio message to the base station.

According to the stated structure, the user who transmits the audio message is able to listen to message, and therefore is able to check the message transmitted.

Here, the mobile communication terminal may further include a time storage unit operable to store time information indicating a length of time, wherein the message transmission unit transmits the selected audio message to the base station after the indicated length of time has elapsed from commencement of reception of the incoming call.

According to the stated structure, the length of time from when an incoming call is received to when an audio message is transmitted can be determined according to the stored time. By changing this time, the length of time from when an incoming call is received to when an audio message is transmitted can be changed.

Here, the mobile communication terminal may be a mobile telephone, wherein each of the different formats complies with a different one of audio compression methods.

According to the stated structure, audio messages generated in a plurality of formats are stored, and the response message function can be used in regions that use the audio compression methods of the stored audio messages.

For example, a response message function with a response message generated in EVRC is used in Japan, and a response message function with a response message generated in QCELP is used in another country.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A mobile communication terminal, comprising:
   a message storage unit operable to store a plurality of audio messages having identical meaning, that have been generated in respectively different audio compression formats;
   a format obtaining unit operable to obtain, from a base station, format identification information that identifies an audio compression format, during an incoming call from the base station;
   a message selection unit operable to select, from among the stored audio messages, an audio message that has been generated in the identified audio compression format; and
   a message transmission unit operable to transmit the selected audio message to the base station.

2. The mobile communication terminal of claim 1, further comprising:
   an obtaining unit operable to download the plurality of audio messages via a communication network, and store the downloaded audio messages in the message storage unit.

3. The mobile communication terminal of claim 2, further comprising:
   a playback unit operable to play the audio message when the message transmission unit transmits the audio message to the base station.

4. The mobile communication terminal of claim 3, further comprising:
   a time storage unit operable to store time information indicating a length of time,
   wherein the message transmission unit transmits the selected audio message to the base station after the indicated length of time has elapsed from commencement of reception of the incoming call.

5. The mobile communication terminal of claim 1, further comprising:
   a playback unit operable to play the audio message when the message transmission unit transmits the audio message to the base station.

6. The mobile communication terminal of claim 5, further comprising:
   a time storage unit operable to store time information indicating a length of time, wherein the message transmission unit transmits the selected audio message to the base station after the indicated length of time has elapsed from commencement of reception of the incoming call.

7. The mobile communication terminal of claim 1, further comprising:
   a time storage unit operable to store time information indicating a length of time,
   wherein the message transmission unit transmits the selected audio message to the base station after the indicated length of time has elapsed from commencement of reception of the incoming call.

8. The mobile communication terminal of claim 1 wherein the plurality of audio messages having identical meaning, that have been generated in respectively different audio compression formats, also have identical content.

9. A message transmission method used in a mobile communication terminal, comprising:
   a format obtaining step of obtaining, from a base station, format identification information that identifies an audio compression format, during an incoming call from the base station;
   a message selection step of selecting, from among audio messages identical meaning stored in a memory that have been generated in respectively different audio compression formats, an audio message that has been generated in the identified audio compression format; and
   a message transmission step of transmitting the selected audio message to the base station.

10. The message transmission method of claim 9, further comprising:
    an obtaining step of downloading the plurality of audio messages via a communication network, and storing the downloaded audio messages in the memory.

11. The message transmission method of claim 9, farther comprising:

a playback step of playing the audio message when the audio message is transmitted to the base station in the message transmission step.

12. The message transmission method of claim 11, wherein, in the message transmission step, the selected audio message is transmitted to the base station after a length of time indicated by time information stored in a memory has elapsed from commencement of reception of the incoming call.

13. A mobile communication terminal that communicates with either of a first base station and a second base station, the first base station being capable of communicating with a mobile communication terminal that plays an audio message generated in a first audio compression format, and the second base station being capable of communicating with a mobile communication terminal that plays an audio message generated in a second audio compression format, the mobile communication terminal comprising:
- a message storage unit operable to store the audio message generated in the first audio compression format and the audio message generated in the second audio compression format, the audio message generated in the first audio compression format and the audio message generated in the second audio compression format having identical meaning;
- a format obtaining unit operable to, during an incoming-call from the first base station, obtain format identification information that shows the first audio compression format from the first base station, and during an incoming-call from the second base station, obtain format identification information that shows the second audio compression format from the second base station;
- a message selection unit operable to,
    - if the received format identification information is the format information showing the first audio compression format, select, from among the stored audio messages, the audio message generated in the first audio compression format, and
    - if the received format identification information is the format information showing the second audio compression format, select, from among the stored audio messages, the audio message generated in the second audio compression format; and
- a message transmission unit operable to,
    - if the selected audio message is the audio message generated in the first audio format, transmit the audio message generated in the first audio format, and
    - if the selected audio message is the audio message generated in the second audio format, transmit the audio message generated in the second audio format.

14. The mobile communication terminal of claim 13 wherein the mobile communication terminal is a mobile telephone.

15. The mobile communication terminal of claim 13 further comprising
- a unit for receiving an audio input;
- a unit to commence reception of an audio input by the unit for receiving an audio input;
- a unit to cease reception of the audio input by the unit for receiving an audio input;
- a unit to compress the audio input according to the first audio compression format
- and to compress the audio input according to the second audio compression format.

* * * * *